US006605684B2

(12) United States Patent
Primeaux, II et al.

(10) Patent No.: US 6,605,684 B2
(45) Date of Patent: *Aug. 12, 2003

(54) METHOD OF PREPARING SPRAY ELASTOMER SYSTEMS

(75) Inventors: Dudley J. Primeaux, II, Elgin, TX (US); Robert L. Zimmerman, Austin, TX (US); Kenneth M. Hillman, Georgetown, TX (US)

(73) Assignee: Huntsman Petrochemical Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/046,936

(22) Filed: Jan. 14, 2002

(65) Prior Publication Data

US 2002/0103326 A1 Aug. 1, 2002

Related U.S. Application Data

(63) Continuation of application No. 09/481,245, filed on Jan. 11, 2000, now Pat. No. 6,399,736, which is a continuation-in-part of application No. 08/815,154, filed on Mar. 11, 1997, now Pat. No. 6,013,755.

(51) Int. Cl.$^7$ .................. C08G 18/32; C08G 18/46; C08G 18/50

(52) U.S. Cl. .............. 528/68; 528/60; 528/61; 528/64; 528/76; 528/84

(58) Field of Search .............. 528/68, 60, 61, 528/64, 76, 84

(56) References Cited

U.S. PATENT DOCUMENTS

| | | | | |
|---|---|---|---|---|
| 5,162,388 A | * | 11/1992 | Primeaux, II | 521/159 |
| 5,189,075 A | * | 2/1993 | Zimmerman et al. | 521/159 |
| 5,218,005 A | * | 6/1993 | Zimmerman et al. | 521/58 |
| 5,243,012 A | * | 9/1993 | Wicks et al. | 528/58 |
| 5,312,886 A | * | 5/1994 | House et al. | 528/64 |
| 5,442,034 A | * | 8/1995 | Primeaux, II | 528/60 |
| 5,480,955 A | * | 1/1996 | Primeaux, II | 528/60 |
| 5,489,704 A | * | 2/1996 | Squiller et al. | 560/35 |
| 5,504,181 A | * | 4/1996 | Primeaux, II | 528/60 |
| 5,516,873 A | * | 5/1996 | Hicks et al. | 528/60 |
| 5,559,204 A | * | 9/1996 | Squiller et al. | 528/84 |
| 5,580,945 A | * | 12/1996 | Wade et al. | 528/49 |
| 5,623,045 A | * | 4/1997 | Zwiener et al. | 528/68 |
| 6,005,062 A | * | 12/1999 | Hansen et al. | 528/68 |

OTHER PUBLICATIONS

Primeaux II, D. J.; "100% Solids Aliphatic Spray Polyurea Elastomer Systems"; Polyurethanes World Congress 1991; SPI/SOPA; Nice, France; 1991; pp. 473–477.*

Primeaux II, D. J.; "100% Solids Aliphatic Spray Polyurea Elastomer Systems"; Journal of Elastomers and Plastics; vol. 24, No. 4; Oct., 1992; pp. 323–336.*

Wicks, D. A. et al.; "Control of the Reaction Between Polyaspartic Esters and Aliphatic Polyisocyanates"; Water–Borne & Higher–Solids and Powder Coatinds Symposium; Feb. 24–26, 1993; New Orleans, LA.*

Luthra, A. et al.; "Applications of Polyaspartic Esters in Polyurea Coatings"; 21st Higher Solids and Waterbourne Coatings Symposium; Feb., 1994; New Orleans, LA; pp. 398–419.*

House, D. W. et al.; "The Use of a New Class of Light–Stable Aliphatic Diamines on Polyurea Coating"; 35th Annual Polyurethane Technical/Marketing Conference; Oct. 9–12, 1994, pp. 74–87.*

* cited by examiner

Primary Examiner—Yogendra N. Gupta
Assistant Examiner—Derrick G Hamlin
(74) Attorney, Agent, or Firm—O'Keefe, Egan & Peterman LLP

(57) ABSTRACT

This invention concerns a method for the preparation of polyurea elastomers, comprising: (a) reacting an amine chain extender with dialkyl maleate to form an aspartic ester, wherein the chain extender has a molar amount of amine groups that is greater than the moles of dialkyl maleate; (b) blending the aspartic ester with one or more polyoxyalkyleneamines to prepare a resin blend; (c) contacting the resin blend with an isocyanate under conditions effective to form a polyurea elastomer. This invention concerns a method for the preparation of polyurethane elastomers, comprising: (a) reacting an diamine chain extender with dialkyl maleate or fumarate, wherein the mole ratio of primary amine functionality in the diamine chain extender to dialkyl maleate or fumarate is more than 1:1; (b) coating a substrate with effective film forming amounts of the product of step (a), an isocyanate, and a polyhydroxyl compound under conditions effective to form a the polyurethane elastomer.

20 Claims, No Drawings

METHOD OF PREPARING SPRAY ELASTOMER SYSTEMS

This application is a continuation of co-pending U.S. application Ser. No. 09/481,245, filed Jan. 11, 2000, now U.S. Pat. No. 6,399,736 which is a continuation-in-part of U.S. application Ser. No. 08/815,154, filed Mar. 11, 1997, now U.S. Pat. No. 6,013,755, incorporated herein by reference.

BACKGROUND OF INVENTION

This invention concerns polyurea or polyurethane elastomers prepared from aspartic esters, and processes for the preparation thereof.

Polyurea and polyurethane elastomers have previously been made using primary amines as reactants. One common problem with such systems is the high reactivity of the polymerization reaction. As a result, it is difficult to obtain smooth finishes in coatings made from the polyurea and polyurethane elastomers. To decrease the reactivity of the system, it has been previously proposed to employ secondary amines as the amine component of the system. One such secondary amine that has been proposed is polyaspartic ester, which is derived from a primary polyamine and diethyl maleate, for example. The polyaspartic ester derived polyureas have a number of advantageous properties, such as smooth, glossy film surface, excellent elongation (high) at a high elastomer strength, excellent ultraviolet color stability, good low temperature property retention and flexibility, slow reactivity for ease of processing and substrate wet-out (improved adhesion). Use of the polyaspartic esters, however, results in slow polymerization reaction. A polyaspartic ester system has proven to be too slow for rapid coating applications. Hence, these systems heretofore required catalysts such as organo tin compounds to increase the reactivity to acceptable levels. However, the catalysts increase cost of such polyureas and polyurethanes, increase the complexity of the manufacturing processes. In addition, use of catalysts lead to poor component stability over extended periods, increased moisture sensitivity in the system, overall system reactivity being affected by changes in environmental and substrate temperature, and polymer breakdown under stressful conditions that do not normally affect polyurea and polyurethane systems (i.e., high heat/humidity, UV light).

SUMMARY OF INVENTION

This invention solves one or more of the problems and disadvantages described above.

In one broad respect, this invention is a method for the preparation of polyurea elastomers, comprising: (a) reacting an amine chain extender with dialkyl maleate or dialkyl fumarate to form an aspartic ester, wherein the chain extender has a molar amount of amine groups that is greater than the moles of dialkyl maleate; (b) blending the aspartic ester with one or more polyoxyalkyleneamines to prepare a resin blend; (c) contacting the resin blend with an isocyanate under conditions effective to form a polyurea elastomer.

In another broad respect, this invention is a polyurea elastomer, comprising the reaction product of (a) a resin blend containing one or more polyoxyalkyleneamine and an aspartic ester and (b) an isocyanate, wherein the aspartic ester in the resin blend comprises a reaction product of an amine chain extender and a dialkyl maleate or dialkyl fumarate, wherein the mole ratio of amine functionality in the amine chain extender to dialkyl maleate or fumarate is greater than 1:1.

In one broad respect, this invention is a method for the preparation of polyurethane elastomers, comprising: (a) reacting an diamine chain extender with dialkyl maleate or fumarate, wherein the mole ratio of primary amine functionality in the diamine chain extender to dialkyl maleate or fumarate is more than 1:1; (b) coating a substrate with effective film forming amounts of the product of step (a), an isocyanate, and a polyhydroxyl compound under conditions effective to form a the polyurethane elastomer.

In another broad respect, this invention is a polyurethane elastomer, comprising the reaction product of (a) a resin blend containing one or more polyoxyalkyleneamine and a reaction product of a diamine chain extender and a dialkyl maleate or fumarate, wherein mole ratio of primary amine functionality in the diamine chain extender to the dialkyl maleate or fumarate is greater than 1:1, (b) an isocyanate, and (c) a polyhydroxyl compound.

The polyurea and polyurethane of this invention advantageously possesses acceptable gel and tack free times. As a result, the polyureas and polyurethanes provide smooth coatings when applied. In addition, by varying the dialkyl maleate content of the polyaspartic ester there is some primary amine available for reaction control such that a variety of system reactivities can be achieved. As a result, the present invention advantageously provides a rapid, predictable cure. The process of this invention provides a slower cure aliphatic polyurea spray elastomer, resulting in smooth, level surfaces without the presence of spray lines or overspray. Furthermore, the present aspartic ester systems of this invention flow together well and become tack free in a reasonable time at wide ranges of ambient temperature. Moreover, the aspartic ester systems of this invention achieve excellent adhesion to smooth steel panels and other substrates as described herein, probably due to improved elastomer wet out of the surface.

DETAILED DESCRIPTION OF THE INVENTION

The present invention relates generally to sprayable polyurea and polyurethane elastomers and methods for preparation of such elastomer systems. The present polyurea elastomer systems include the reaction product of (a) a pre-blend of an amine terminated polyether and an aspartic ester and (b) an isocyanate compound to produce a polyurea elastomer. Because of the reactivity of the preferred aliphatic system, the elastomers of the present invention are more useful in spray systems relative to other elastomer systems, such as reactive injection molding systems.

Aspartic Esters

The aspartic esters that can be employed in the practice of this invention comprise the reaction product of a polyamine and a dialkyl maleic or fumaric acid ester. The aspartic esters can be formed by known methods, which generally entail reacting the polyamine with the dialkyl maleic or fumaric acid ester such that a reaction product is formed. Such procedures are set forth in the examples herein and are described in U.S. Pat. No. 5,243,012. In the practice of the present invention, the mole ratio of amine functionality in the amine chain extender to dialkyl maleate or fumarate is greater than 1:1. Typically, the mole ratio of amine functionality to dialkyl maleate or fumarate is greater than about 4:1. In one embodiment of this invention, the mole ratio is about 2:1 (about one-half of the amine groups have been reacted with the double bond of the dialkyl maleate or fumarate).

The primary polyamines generally correspond to the formula: $X(NH_2)_n$, wherein X represents an organic group which as a valence of n and is inert towards isocyanate groups at a temperature of 100 centigrade or less. In certain embodiments, X represents a divalent hydrocarbon group obtained by removal of the amino groups from an aliphatic, araliphatic or cycloaliphatic polyamine, particularly a diamine. The "n" represents an integer with a value of at least about 2, in certain embodiments from about 2 to about 4, and in one embodiment 2. Representative examples of such polyamines include, but are not limited to, ethylene diamine, 1,2-diaminopropane, 1,4-diaminobutane, 1,3-diaminopentane, 1,6-diaminohexane, 2,5-diamino-2,5-dimethlhexane, 2,2,4- and/or 2,4,4-trimethyl-1,6-diaminohexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4' and/or 4,4'-diaminodicyclohexyl methane and 3,3'-dialkyl-4,4'-diamino-dicyclohexyl methanes such as 3,3'-dimethyl-4,4'-diamino-dicyclohexyl methane and 3,3'-diethyl-4,4'-diaminodicyclohexyl methane; aromatic polyamines such as 2,4- and/or 2,6-diaminotoluene and 2,6-diaminotoluene and 2,4' and/or 4,4'-diaminodiphenyl methane; and polyoxyalkylene polyamines (also referred to herein as amine terminated polyethers), especially diamines, as are described hereinbelow. Mixtures of polyamines can be employed in preparing the aspartic esters used in the practice of this invention.

The maleic or fumaric acid esters generally correspond to formula I: $R^1OOC—CR^3=CR^4—COOR^2$ wherein $R^1$ and $R^2$ may be the same or different and represent organic groups which are inert towards isocyanate groups at a temperature of 100 centigrade or less. $R^1$ and $R^2$ may be, for example, methyl or ethyl groups. Such maleic or fumaric acid esters include, but are not limited to, those corresponding to the formula which are dimethyl, diethyl and dibutyl esters of maleic acid and fumaric acid and corresponding to maleic or fumaric acid esters substituted by methyl in the 2- and/or 3-position. Representative examples of useful maleic acid esters include dimethyl maleate, diethyl maleate, dibutyl maleate, dioctyl maleate and mixtures thereof.

Certain of the aspartic esters of this invention may be represented by the formula: $X[—NH—C(R^3)(COOR^1)—CH(R^4)(COOR^2)]_n$, wherein X, $R^{1-4}$ and n are as described above.

Polyurethane

The cross-linking which takes place in the process according to the present invention is based on an addition reaction between polyisocyanate component a) and isocyanate-reactive component b), in particular the polyamines containing secondary amino groups, which are also known as "polyaspartic acid derivatives."

Suitable polyisocyanates for use as polyisocyanate component a) in accordance with the present invention include the known polyisocyanates of polyurethane chemistry. Examples of suitable low molecular weight polyisocyanates having a molecular weight of 168 to 300 include hexamethylene diisocyanate, 2,2,4- and/or 2,4,4-trimethyl-1,6-hexamethylene diisocyanate, dodecamethylene diisocyanate, 1,4-diisocyanatocyclohexane, 1-isocyanato-3,3,5-trimethy-5-isocyanatomethylcyclohexane (IPDI), 2,4'- and/or 4,4'-diisocyanato-dicyclohexyl methane, 2,4- and/or 4,4'-diisocyanato-diphenyl methane and mixtures of these isomers with their higher homologues which are obtained in known manner by the phosgenation of aniline/formaldehyde condensates, 2,4-and/or 2,6-diisocyanatotoluene and any mixtures of these compounds.

It is preferred, however, to use derivatives of these monomeric polyisocyanates, as is conventional in coatings technology. These derivatives include polyisocyanates containing biuret groups as described, for example, in U.S. Pat. Nos. 3,124,605, 3,201,372 and DE-OS 1,101,394; polyisocyanates containing isocyanurate groups as described, for example, in U.S. Pat. No. 3,001,973, DE-PS 1,022,789, 1,222,067 and 1,027,394 and DE-OS 1,929,034 and 2,004,048; polyisocyanates containing urethane groups as described, for example, in DE-OS 953,012, BE-PS 752,261 and U.S. Pat. Nos. 3,394,164 and 3,644,457; polyisocyanates containing carbodiimide groups as described in DE-PS 1,092,007, U.S. Pat. No. 3,152,162 and DE-OS 2,504,400, 2,537,685 and 2,552,350; and polyisocyanates containing allophanate groups as described, for example, in GB-PS 994,890, BE-PS 761,626 and NL-OS 7,102,524.

The modified polyisocyanates are particularly preferred: N,N', N-tris-(6-isocyanatohexyl)-biuret and mixtures thereof with its higher homologues and N,N', N-tris-(6-isocyanatohexyl)-isocyanurate and mixtures thereof with its higher homologues containing more than one isocyanurate ring.

Isocyanate group-containing prepolymers and semi-prepolymers based on the monomeric simple or modified polyisocyanates exemplified above and organic polyhydroxyl compounds are also preferred for use as polyisocyanate component a). These prepolymers and semi-prepolymers generally have an isocyanate content of about 0.5 to 30% by weight, preferably about 1 to 20% by weight, and are prepared in known manner by the reaction of the above mentioned starting materials at an NCO/OH equivalent ratio of about 1.05:1 to 10:1 preferably about 1.1:1 to 3:1, this reaction being optionally followed by distillative removal of any unreacted volatile starting polyisocyanates still present.

The prepolymers and semi-prepolymers may suitably be prepared from low molecular weight polyhydroxyl compounds having a molecular weight of 62 to 299, such as ethylene glycol, propylene glycol, trimethylol propane, 1,6-dihydroxy hexane; low molecular weight, hydroxyl-containing esters of these polyols with dicarboxylic acids of the type exemplified hereinafter; low molecular weight ethoxylation and/or propoxylation products of these polyols; and mixtures of the preceding polyvalent modified or unmodified alcohols.

The prepolymers and semi-prepolymers are, however, preferably prepared from the known relatively high molecular weight polyhydroxyl compounds of polyurethane chemistry which have a molecular weight of 300 to about 8000, preferably about 1000 to 5000, as determined from the functionality and the OH number. These polyhydroxyl compounds have at least two hydroxyl groups per molecule and generally have a hydroxyl group content of about 0.5 to 17% by weight, preferably about 1 to 5% by weight.

Examples of suitable relatively high molecular weight polyhydroxyl compounds which may be used for the preparation of the prepolymers and semi-prepolymers include the polyester polyols based on the previously described low molecular weight, monomeric alcohols and polybasic carboxylic acids such as adipic acid, sebacic acid, phthalic acid, isophthalic acid, tetrahydrophthalic acid, hexahydrophthalic acid, maleic acid, the anhydrides of these acids and mixtures of these acids and/or acid anhydrides. Hydroxyl group-containing polylactones, especially poly-ε-caprolactones, are also suitable for the preparation of the prepolymers and semi-prepolymers.

Polyether polyols, which are obtained in known manner by the alkoxylation of suitable starting molecules, are also suitable for the preparation of the isocyanate group-containing prepolymers and semi-prepolymers. Examples of suitable starting molecules for the polyether polyols include the previously described monomeric polyols, water, organic polyamines having at least two NH bonds and any mixtures of these starting molecules. Ethylene oxide and/or propylene oxide are particularly suitable alkylene oxides for the alkoxylation reaction. These alkylene oxides may be introduced into the alkoxylation reaction in any sequence or as a mixture.

Also suitable for the preparation of the prepolymers and semi-prepolymers are the hydroxyl group-containing polycarbonates which may be prepared by the reaction of the previously described monomeric diols with phosgene and diaryl carbonates such as diphenyl carbonate.

Component b) used to prepare the polyurethane is based in whole or in part on the aspartic esters described above.

The preparation of the "polyaspartic acid derivatives" corresponding to formula I from the above mentioned starting materials may be carried out, for example, at a temperature of 0° to 100° C. Excess starting materials may be removed by distillation after the reaction. The reaction may be carried out solvent-free or in the presence of suitable solvents such as methanol, ethanol, propanol, dioxane and mixtures of such solvents. The binders present in the coating compositions according to the invention are based on mixtures of polyisocyanate component a) with the secondary polyamines corresponding to formula I or mixtures of polyisocyanate component a) with the secondary polyamines and other isocyanate-reactive compounds.

These other optionally used isocyanate-reactive compounds are preferably organic polyhydroxyl compounds known from polyurethane chemistry and include both the low molecular weight polyhydroxyl compounds and the relatively high molecular weight polyhydroxyl compounds previously set forth for the preparation of the prepolymers and semi-prepolymers suitable for use as polyisocyanate component a).

Isocyanate-reactive compounds which may be used as a portion of component b) are the hydroxy functional polyacrylates known for use in polyurethane coatings. These compounds are hydroxyl-containing copolymers of olefinically unsaturated compounds having a number average molecular weight (Mn) determined by vapor pressure or membrane osmometry of about 800 to 50,000, preferably about 1000 to 20,000 and more preferably about 5000 to 10,000, and having a hydroxyl group content of about 0.1 to 12% by weight, preferably about 1 to 10% by weight and most preferably about 2 to 6% by weight. The copolymers are based on olefinic monomers containing hydroxyl groups and olefinic monomers which are free from hydroxyl groups. Examples of suitable monomers include vinyl and vinylidene monomers such as styrene, o-methyl styrene, o- and p-chloro styrene, o-, m- and p-methyl styrene, p-tert-butyl styrene; acrylic acid; (meth)acrylonitrile; acrylic and methacrylic acid esters of alcohols containing 1 to 8 carbon atoms such as ethyl acrylate, methyl acrylate, n- and iso-propyl acrylate, n-butyl acrylate, 2-ethylhexyl acrylate, 2-ethylhexyl methacrylate, iso-octyl acrylate, methyl methacrylate, ethyl methacrylate, butyl methacrylate and isooctyl methacrylate; diesters of fumaric acid, itaconic acid or maleic acid having 4 to 8 carbon atoms in the alcohol component; (meth)acrylic acid amide; vinyl esters of alkane monocarboxylic acids having 2 to 5 carbon atoms such as vinyl acetate or vinyl propionate; and hydroxyalkyl esters of acrylic acid or methacrylic acid having 2 to 4 carbon atoms in the hydroxyalkyl group such as 2-hydroxyethyl-, 2-hydroxypropyl-, 4-hydroxybutyl-acrylate and methacrylate and trimethylol propane-mono- or pentaerythritomonoacrylate or methacrylate. Mixtures of the monomers exemplified above may also be used for the preparation of the hydroxy functional polyacrylates. Mixtures of the polyhydroxyl compounds previously described may be used as a portion of component b).

In the binders used according to the invention for preparing the polyurethane compositions, components a) and b) are used in amounts sufficient to provide an equivalent ratio of isocyanate groups to isocyanate-reactive groups of about 0.8:1 to 20:1, preferably about 0.8:1 to 2:1, more preferably about 0.8:1 to 1.2:1 and most preferably about 1:1. The optional polyhydroxyl compound is present in component b) in an amount such that up to 20 hydroxyl groups are present for each secondary amino group from the compounds corresponding to formula I, preferably the equivalent ratio of hydroxyl groups to secondary amino groups is about 10:1 to 1:10.

The binders to be used according to the invention are prepared by mixing the individual components together although if the optional polyhydroxyl compounds may be initially blended with the aspartic esters. Preparation of the binders is carried out solvent-free or in the presence of the solvents conventionally used in polyurethane coatings. It is an advantage of the process according to the invention that the quantity of solvent used may be greatly reduced when compared with that required in known two-component systems.

Examples of suitable solvents include xylene, butyl acetate, methyl isobutyl ketone, methoxypropyl acetate, N-methyl pyrrolidone, Solvesso solvent, petroleum hydrocarbons, iso-butanol, butyl glycol, chlorobenzenes and mixtures of such solvents. The alcoholic solvents previously mentioned may be used, provided that the optional polyhydroxyl compounds are not used.

In the coating compositions to be used for the process according to the invention, the ratio by weight of the total quantity of binder components a) and b) to the quantity of solvent is about 40:60 to 100:0, preferably about 60:40 to 90:10. The coating compositions to be used for the process according to the invention may also contain other auxiliary agents and additives conventionally used in polyurethane coatings, in particular pigments, fillers, leveling agents, catalysts, anti-settling agents, and the like.

The properties of the polyurethane coatings obtained by the process according to the invention may be adjusted, in particular by suitable choice of the nature and proportions of the starting components a) and b). Thus, for example, the presence of relatively high molecular weight, linear polyhydroxyl compounds either in the prepolymers or semi-prepolymers of component a) and/or in component b) increases the elasticity of the coatings; whereas, the absence of such starting components increases the crosslinking density and hardness of the resulting coatings.

For carrying out the process according to the invention, the polyurethane coating compositions to be used according to the invention are applied as one or more layers to substrates by known methods such as spraying, brush coating, immersion or flooding or by means of rollers or doctor applicators. The process according to the invention is suitable for the formation of coatings on any substrates, e.g., metals, plastics, wood or glass. The process according to the invention is particularly suitable for the formation of coatings on sheet steel, for example, for the manufacture of car bodies, machines trim panels, vats or containers. The substrates to be coated by the process according to the invention may be treated with suitable primers before the process according to the invention is carried out.

After the substrates exemplified above have been coated, the coatings are cured by the process according to the invention at a temperature of about −20° C. to 100° C. Curing is preferably carried out at a temperature about 10° C. to 80° C. by air drying or so-called forced drying. It is of great benefit that the coatings will not thermally degrade even at the higher temperatures which may occur in the event of a breakdown of the coatings plant.

Polyurea

The amine terminated polyethers, isocyanates, and chain extender that can be used in accordance with the present invention are those well known in the polyurea art as described in U.S. Pat. Nos. 4,891,086; 5,013,813; 5,082,917; 5,162,388; 5,171,819; 5,189,075; 5,418,005; 5,466,671; and 5,317,076, all incorporated herein by reference.

The active amine hydrogen containing materials useful in the present invention are amine terminated polyethers. Preferably, the amine terminated polyethers are selected from animated diols or triols and, more preferably, include a blend of animated diols or triols or both. More preferably, the amine terminated polyethers are selected from mixtures of high molecular weight polyols, such as mixtures of difunctional and trifunctional materials. However, a single high molecular weight aminated polyurea can be used. Also, high molecular weight amine terminated alkylenes and simple alkyl amines are included within the scope of this invention, and may be used alone or in combination with the aforementioned amine terminated polyols. In addition, other amine terminated materials having different molecular weights or different chemical compositions, may be used. The term began "high molecular weight" is intended to include polyether amines having a molecular weight of at least about 1,500.

Especially preferred are amine terminated polyethers, including primary and secondary amine terminated polyethers of greater than 1,500 average molecular weight, having a functionally of from about 2 to about 6, preferably from about 2 to about 3, and amine equivalent weight of from about 750 to about 4,000. Mixtures of amine terminated polyethers may be used. In a preferred embodiment, the amine terminated polyethers have an average molecular weight of at least about 2,000. These materials may be made by various methods known in the art.

The amine terminated polyethers useful in this invention may be, for example, polyether resins made from an appropriate initiator to which lower alkylene oxides, such as ethylene oxide, propylene oxide, butylene oxide, or mixtures thereof, are added with the resulting hydroxyl terminated polyols then being aminated. When two or more oxides are used, they may be present as random mixtures or as blocks of one or the other polyether. In the amination step, it is highly desirable that the terminal hydroxyl groups in the polyols be essentially all secondary hydroxyl groups for ease of amination. If ethylene oxide is used, it is desirable to cap the hydroxyl terminated polyol with a small amount of higher alkylene oxide to ensure that the terminal hydroxyl groups are essentially all secondary hydroxyl groups. The polyols so prepared are then reductively aminated by known techniques, such as described in U.S. Pat. No. 3,654,370, for example, the contents of which are incorporated herein by reference. Normally, the animation step does not completely replace all of the hydroxyl groups. However, the great majority of hydroxyl groups are replaced by amine groups. Therefore, in a preferred embodiment, the amine terminated polyether resins useful in this invention have greater than about 80 percent of their active hydrogens in the form of amine hydrogens.

Particularly preferred are the JEFFAMINE™ brand series of polyether amines available from Huntsman Corporation; they include JEFFAMINE™ D-2000, JEFFAMINE™ D-4000, JEFFAMINE™ D-3000 and JEFFAMINE™ T-5000. These polyether amines are described with particularly in Texaco Chemical Company's product brochure entitled "The JEFFAMINE Polyoxyalkyleneamines".

Both aliphatic and aromatic isocyanates can be used in the present invention. The aliphatic isocyanates employed in the present invention are well known in the polyurea elastomer art. Thus, for instance, the aliphatic isocyanates are of the type described in U.S. Pat. No. 4,748,192, the contents of which are incorporated herein by reference. Accordingly, they are typically aliphatic diisocyanates and, more particularly, are the trimerized or the biuretic form of an aliphatic diisocyanate, such as hexamethylene diisocyanate, or the bifunctional monomer of the tetraalkyl xylene diisocyanate such as the tetramethyl xylene diisocyanate. Also, cyclohexane diisocyanate is considered the preferred aliphatic isocyanate. Other useful aliphatic polyisocyanates are described in U.S. Pat. No. 4,705,814, which is incorporated herein by reference. They include aliphatic diisocyanates, for example, alkylene isocyanates with 4 to 12 carbon atoms in the alkylene radical, such as 1,12-dodecane diisocyanate and 1,4-hexamethylene diisocyanate. Also useful are cycloaliphatic isocyanates, such as 1,3- and 1,4-cyclohexane diisocyanate, as well as any desired mixture of these isomers: 1-isocyanato-3,3,5-trimethyl-5-isocyanatomethylcyclohexane (isophorone diisocyanate); 4,4', 2,2'- and 2,4'-dicyclohexylmethane diisocyanate; as well as the corresponding isomer mixtures, and the like. The aforementioned isocyanates can be used alone or in combination.

A wide variety of aromatic polyisocyanates can also be utilized to produce the aromatic elastomer system of the present invention. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanato phenyl)methane, and 4,4' diphenylpropane diisocyanate.

Other aromatic polyisocyanates used in the practice of the invention are naphthalene-bridged polyphenyl polyisocyanates mixtures which have a functionality of from about 2 to about 4. These latter isocyanate compounds are generally produced by the phosgenation of corresponding naphthalene bridged polyphenyl polyamines, which are conventionally produced by the reaction of formaldehyde and primary aromatic amines, such as aniline, and the presence of hydrochloric acid and/or other acidic catalysts. Known processes for preparing polyamines and corresponding naphthalene-bridged polyphenyl polyisocyanates there from are described in the literature and in many patents, for example, U.S. Pat. Nos. 2,683,730; 2,950,263; 3,012,008; 3,344,162; and 3,362,979, all incorporated herein by reference.

Usually naphthalene-bridged polyphenyl polyisocyanates mixtures contain from about 20 to about 100 percent by weight naphthalene diphenyl diisocyanate isomers, with the remainder being polymethylene polyphenyl diisocyanates having higher functionalities and higher molecular weights. Typical of these are polyphenyl polyisocyanates mixtures containing from about 20 to about 100 percent by weight diphenyl diisocyanate isomers, of which from about 20 to about 95 percent by weight thereof is the 4 4'-isomers with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3, 362, 979.

By far the most preferred aromatic polyisocyanate is naphthalene bis (4-phenyl isocyanate) or "MDI". Pure MDI, quasi-prepolymers of MDI, and modified pure MDI, etc., are useful. Materials of this type may be used to prepare suitable elastomers. Since pure MDI is a solid and, thus, inconvenient to use, liquid products based on MDI or naphthalene are also disclosed. For example, U.S. Pat. No. 3, 394, 164, which is incorporated herein by reference, describes a liquid MDI product. More generally, uretomine modified pure MDI is also included. This product is made by heating pure distilled MDI in the presence of a catalyst. Examples of commercial materials of this type are ISONATE™ 125M (pure MDI) and ISONATE™ 143L, RUBINATE™ LF-168 and RUBINATE™ LF-209 ("liquid" MDI's). The ISONATE™ products are available from The Dow Chemical Company, and the RUBINATE™ products are available from ICI Polyurethanes. Preferably, the amount of isocyanate used to produce the present polyurea elastomers is the equal to or greater than the stoichiometric amount based on the active hydrogen ingredients in the formulation.

It is to be understood that the term "isocyanate" also includes quasi-prepolymers of isocyanates with active hydrogen-containing materials. The active hydrogens-containing, materials used to prepare a prepolymer can include a polyol or a high molecular weight amine-terminated polyether, also described herein as amine-terminated alkylenes, or a combination of these materials. The amine-terminated polyethers useful in preparing quasi-prepolymers of isocyanate include the same amine-terminated polyethers described herein as amine-terminated materials for producing polyurea.

The polyols useful in preparing a quasi prepolymer include polyether polyols, polyester diols, triols, tetrols, etc., having an equivalent weight of at least about 500, and preferably at least about 1,000 up to about 4,000. These polyether polyols based on trihydric initiators of about 3,000 molecular weight and above are especially preferred. The polyethers may be prepared from ethylene oxide, propylene oxide, butylene oxide, or mixtures thereof. Other high molecular weight polyols that may be useful in this invention are polyester of hydroxyl-terminated rubbers, for example, hydroxyl terminated polyether polybutadiene. Quasi-prepolymers prepared from hydroxyl-terminated polyols and isocyanates are generally reserved for use with aromatic polyurea systems.

The present polyurea elastomer systems may also comprise an amine-terminated chain extender. The aromatic chain extender useful in the present invention include those amine-terminated aromatic chain extenders that are well known in the polyurea art. Typical aromatic chain extenders include, for example, 1-methyl-3,5-trimethyl-2,4-diamino benzene, 1-methyl-3,5-trimethyl-2,6-diamino benzene (both of these materials are also called diethyl toluene diamine or DETDA and commercially available as ETHACURE™ 100 from the Albemarle Corporation, Baton Rouge, La.), 1,3,5-trimethyl-2,6-diamino benzene, 3,5,3',5'-tetramethyl-4,4'-diamino diphenyl methane and the like. Particularly preferred aromatic diamine chain extenders are 1-methyl-3,5-diethyl-2,4-diaminobenzene or a mixture of this compound with 1-methyl-3,5-diethyl-2,6-diaminobenzene.

Other useful aromatic chain extenders including di(methyl thio)-toluenediamine or N,N'-bis(sec-butyl) methylene dianiline, each of which can be used alone or, preferably, in combination with 1-methyl-3,5-diethyl-2,4-diaminobenzene or 1-methyl-3,5-diethyl-2,6-diaminobenzene. This combination includes from about 20 to about 99 parts of di(methylthio) -toluenediamine or N,N'-bis(sec-butyl)methylenedianiline to about 80 to about 1 parts of DETDA. The N,N-' bis(sec-butyl) methylenedianiline is commonly available from U.O.P.

One particularly preferred form of the di(methylthio)-toluenediamine component of the chain extender is ETHACURE™ 300, a product of Albemarle Corp. Specifically, ETHACURE™ 300 is a 4:1 blend of 3,5-di(methylthio)-2, 4-toluenediamine and 3,5-di(methylthio)-2,6-One particularly preferred form of the di(methylthio)-toluenediamine component of the chain extender is ETHACURE™ 300, a product of Albemarle Corp. Specifically, ETHACURE™ 300 is a 4:1 blend of 3,5-di(methylthio)-2,4-toluenediamine and 3,5-di(methylthio)-2,6-toluenediamine, respectively.

Aliphatic chain extenders can also be used with the present invention to produce a purely aliphatic elastomer system. The aliphatic chain extenders useful in the present invention include amine-terminated chain extenders which are generally described as low molecular weight polyoxy-alkyleneamines polyamines containing terminal amine groups. For example, N,N'-bis (t-butyl) ethylene diamine common commercially available from Hoechst Celanese, is a useful as a chain extender.

In particular, cycloaliphatic diamines have been found to be useful in the present invention. These cycloaliphatic diamines include cis-1,4-diamino cyclohexane; isophoronediamine; m-xylene diamine; 4,4'-methylene di-cyclohexylamine; methanediamine; 1,4-diamino-methyl cyclohexane; and substitutes derivatives thereof. Laromine™ C-260, available from BASF Corporation, is representative of an alkyl-substituted 4,4'-methylenedicyclohexylamine derivative. In particular, isophorone diamine is preferred as a cycloaliphatic diamine chain-extender.

To achieve slower elastomer system reactivities while maintaining good cure properties when using cycloaliphatic diamine chain-extenders, some of the active hydrogens groups should be secondary amine groups. Preferably, from about 20% to about 80 percent of the amine groups of the cycloaliphatic diamine are secondary amines. More preferably, the cycloaliphatic diamine has between about 40% to about 60 percent secondary amine groups. An especially preferred cycloaliphatic diamine has about 50 percent secondary amine groups.

The preferred cycloaliphatic diamine chain-extenders having secondary amine groups can be prepared by using a cycloaliphatic diamine, such as isophorone diamine (hereinafter referred to as "IPDA"), and converting a primary amine group to a secondary amine. For example, reacting one mole or less of a dialkyl ketone, preferably acetone, with one mole of IPDA, and then reducing the product, provides IPDA having both primary and secondary amine groups. This modified amine chain-extender has improved reactivity and cure performance in spray polyurea elastomer systems. Preferably, the resulting spray elastomer system has an effective gel time greater than about four seconds. This conversion of some of the primary amine groups of the cyclo aliphatic diamine to secondary amines allows for slowing the cure and improving the properties of aliphatic polyurea elastomers.

The reaction of the cycloaliphatic diamines with the dialkyl ketone may be carried out at from about 80 centigrade to about 210 centigrade and from about 25 psig to about 3,000 psig. A preferred range for the reaction is from about 110 centigrade to about 160 separate and from about 100 psig to about 2000 psig. An especially preferred range for the reaction is from about 120 centigrade to about 140 centigrade and from about 100 psig to about 1500 psig.

By utilizing the modified amine chain-extenders, reciprocity diisocyanate can be used. In previously known aliphatic spray polyurea elastomer systems, only m-tetramethyl xylene diisocyanate, (m-TMXDI™) could be used, due to its slower reactivity. But by using the modified amine chain-extenders terminal physical properties are not adversely affected by the faster reacting isophorone diisocyanate. In fact, physical properties are improved due to the improved mixing characteristics which are a result of those lower reactivities observed. Improved residual tack and excellent impact resistance at −30 centigrade also are noted.

The cycloaliphatic diamine chain-extenders of the present invention give the elastomer system the requisite activity to yield good cure and good spray processing characteristics. Additionally, the aliphatic system is ultraviolet stable and exhibits improved flexibility so that it can be effectively sprayed onto incorrectly shaped substitutes.

Other chain extenders will be apparent to those skilled in the art and the above recitation is merely exemplary.

The polyurea elastomers of the present invention are characterized by urea linkages formed by the reaction of active amine hydrogens groups with isocyanates. However, it is possible that some of the active-hydrogens group in the reaction mixture are in the form of hydroxyl groups. Thus, the polyurea elastomers referred to herein are those formed from reaction mixtures having at least about 80 percent of the active hydrogens groups in the form of amine groups. Preferably, the reaction mixtures have at least about 90 percent of the active hydrogens groups in the form of amine groups, and even more preferably, the reaction mixtures have at least about 95 percent of the active hydrogens groups in the form of amine groups. Those reaction mixtures that are substantially free from, i.e. less than about 1 percent, active hydrogens groups in the form of hydroxyl groups are particularly preferred.

The additive for improving the ultraviolet stability of the present polyurea elastomer systems comprises up to three elements, which are individually classified as a ultraviolet stabilizing element, a ultraviolet absorber element, and an antioxidant element. The additive can be formulated with any one of the three elements or with any combination of two or more of the elements. Preferably, the additive includes an antioxidant element and either a ultraviolet stabilizing or a ultraviolet absorber element. More preferably, the additive includes all three elements. Even more preferably, the additive comprises about 30 to about 50 percent by weight ultraviolet stabilizer element, from about 30 to about 50 percent by weight ultraviolet absorber element, and from about 20 to about 40 percent by weight antioxidant element. A particularly preferred additive comprises about 40 percent violate ultraviolet stabilizer amount, about 40 percent by weight ultraviolet absorber element, and about to 50% by weight antioxidant element. A particularly preferred additive comprises about 40 percent by weight ultraviolet absorber element, and about 20 percent by weight antioxidant element.

The ultraviolet stabilizer element useful in the instant invention generally includes a sterically hindered piperidine derivative, and in particular, an alkyl substituted hydroxy piperidine derivative. Preferably, the ultraviolet stabilizer includes the reaction product of an ester of a carboxylic acid and to alkyl substituted hydroxy piperidines. More preferably, the ultraviolet stabilizer element includes bis-(1, 2,2,6,6-tetramethyl-4-piperidinyl) sebacate, known as TINUVIN™ 765 and commercially available from Ciba-Geigy.

The UV absorber element useful in the instant invention generally includes a substituted benzotriazole, and in particular, a phenyl substituted benzotriazole. Preferably, the UV stabilizer element includes a hydroxyl, alkyl substituted benzotriazole, and more preferably, the UV stabilizer includes 2-(2'-hydroxy-3',5'-di-tert-amylphenyl) benzotriazole, known as TINUVIN™ and commercially available from Ciba-Geigy.

The antioxidant element useful in the instant invention generally includes a substituted, sterically hindered phenol, and in particular, a substituted ester of hydroxyhydrocinnamic acid. Preferably, the antioxidant element includes a 3,5-dialkyl ester of hydroxyhydrocinnamic acid, and more preferably, the antioxidant element includes octadecyl 3,5-di-tert-butyl-4-hydroxyhydrocinnamate, known as IRGANOX™ 1076 and commercially available from Ciba-Geigy.

Accordingly, a preferred additive contains from about 30 to about 50 percent by weight bis(1,2,2,6,6-pentamethyl-4-piperidinyl)sebacate as a UV stabilizer, from about 30 to about 50 percent by weight 2-(2'-hydroxy-3',5'-di-tert-amylphenyl)benzotriazole as a UV radiation absorber, and from about 20 to about 40 percent by weight octadecyl 3,5-di-tert-butyl-4-hydroxyhydrocinnamate as an antioxidant. An especially preferred additive contains about 40 percent by weight bis(1,2,2,6,6-pentamethyl-4-piperidinyl) sebacate, about 40 percent by weight 2-(2'-hydroxy-3',5'-di-tert-amylphenyl)-benzotriazole, and about 20 percent by weight octadecyl 3,5-di-tert-butyl-4-hydroxyhydrocinnamate.

The amount of additive incorporated in the polyurea elastomer systems depends on several factors, including the desired stability of the elastomer, so the amount of additive can be adjusted according to the intended use of the elastomer. Generally, a useful amount of additive in the polyurea system can be an amount of up to about 5 percent by weight of the amine-terminated polyether. Preferably the additive is used in an amount of from about 0.5 to about 3 percent by weight of the amine-terminated polyether. More preferably the additive is used in an amount of from about 1 to about 0.5 percent by weight of the amine-terminated polyether.

The additive can be formulated by blending the individual elements separately from the polyurea reactors. Alternatively, the individual elements can be added directly to the polyurea reaction mixture or to one or more of the other polyurea reactors. For example, when a to stream machine having an A-components and a B-component is used for high pressure impingement mixing as described more fully herein, the additive or the individual elements can be added directly to one of the component tanks. Accordingly, the references herein to the composition of the additive is intended to refer to the relative quantity of these three individual elements whether or not they are actually blended separately from the polyurea reactants. At the same time, if additional elements are used in the additive, the percentages of the elements discussed herein may be adjusted accordingly.

It is believed that the additive does not react with the polyurea reactants, but instead, is simply dispersed within the polyurea matrix. Moreover, the additive has little affect on system reactivity and only a slight affect on elastomer physical properties other then improving ultraviolet stability. Therefore, it is preferable to produce the polyurea elastomers of the present invention by mixing the additive with the polyurea reactions to ensure adequate distribution of the additive within the resulting polyurea matrix. The additive can also be dispersed within the elastomer at any time before the matrix has cured.

Other conventional formulation ingredients may be employed as needed in the polyurea elastomer system of the present invention, such as, for example, foam stabilizers, also known as silicone oils or emulsifiers. The foam stabilizers may be an organic silane or siloxane. For example, compounds may be used having the formula: $RSi[O—(R_2SiO)_n—(oxyalkylene)_mR]_3$, Where R is an alkyl group containing from one to four carbon atoms; n is an integer of from 4 to 8; m is an integer of from 20 to 40, and the oxyalkylene groups are derived from propylene oxide and ethylene oxide. See, for example, U.S. Pat. No. 3,194,773, the contents of which are incorporated herein by reference. Pigments, for example, titanium oxide dioxide, may be incorporated in the elastomer system to impart color properties to the elastomer.

Reinforcing materials, if desired, that are useful in the practice of our invention are known to those skilled in the art. For example, chopped or milled glass fibers, chopped or milled carbon flavors, and/or other mineral fibers are useful.

Post curing of the elastomer of the invention is optional. Post curing will improve some elastomer properties, such as heat sag. Employment of post curing depends on the desired properties of the end product.

Preferably, the polyurea elastomer systems of the present invention are prepared using a two-stream spray machine. As known inn the art, two-stream machines combine two components, an (A) component and a (B) component. The (A) component generally includes an isocyanate material, while the (B) component generally includes an amine-terminated polyether. In addition, other components of the elastomer system, including the UV additive or the individual components, are generally added to the (B) component. The (A) component and (B) component of the polyurea elastomer system are combined or mixed under high pressure; most preferably, they are impingement mixed directly in the high pressure spray equipment which is, for example, a GUSMER™ VR-H-3000 proportioner fitted with a GUSMER™ Model GX-7 spray gun. In particular, a first and second pressurized stream of components (A) and (B), respectively, are delivered from two separate chambers of the proportioner and are impacted or impinged upon each other at high velocity to effectuate an intimate mixing of the two components and, thus, the formation of the elastomer system, which is then coated onto the desired substrate via the spray gun.

The volumetric ratio of the (A) component to the (B) component is generally from about 30 to about 70 percent to about 70 to about 30 percent. Preferably, (A) component and (B) component are employed in a 1:1 volumetric ratio.

However, the use of a two-stream machine is not critical to the present invention and included only as one method for mixing the polyurea reactants and additives.

Advantageously the polyurea reactants discussed herein react to form the present polyurea elastomer system without the aid of a catalyst, and a catalyst may be excluded during the practice of this invention.

As a result of improved thermal properties, the aliphatic polyurea elastomer systems of the instant invention produce excellent candidate materials for automotive interior trim parts which are exposed to heat and sunlight. These pieces may include instrument panel skins, door panel skins, airbag door skins, etc. Surprisingly, the aliphatic spray polyurea materials have excellent impact resistance at −30 centigrade. Moreover, these systems can be used in protective coatings, "paint" applications, membranes, barrier coatings, road marking coatings, and decorative coatings.

Due to the fast reactivity of the polyurea spray elastomer technology, the effective gel time of the spray system is measured by spray applying an excess of material on a vertical surface. The time of flow until the material sets or freezes is measured as gel time. The dry time (tack free time) is measured by spraying an area, either vertical or horizontal, with the elastomer and measuring the time required for the spray surface to become dry to the touch without exhibiting any tacky feel. Typically, polyurea elastomers of the present invention have a tack free time of less than two hours, and a gel time of at least about 8 seconds.

The following examples are illustrative of the invention and are not intended to be construed as limitations on the scope of the invention or claims thereof. In the examples the following equipment, materials and testing protocols were employed. The spray equipment was a GUSMER H-3500 high pressure, high temperature proportioning unit fitted with a GUSMER GX-7 400 series impingement mix spray gun equipped with 50 feet of duel heated, high pressure hose. For processing, a block temperature was set at 160 degrees Fahrenheit (71 Centigrade) for both the isocyanate component and the resin blend component. Hose temperature was set at 160 F. for both components. Processing was at 2500 psig static pressure, 2000 psig spray pressure. Physical property testing for the aliphatic polyurea spray elastomer systems were done in accordance with American Society for Testing and Materials (ASTM) as follows: tensile strength, elongation, 100% and 300% modulus, ASTM D-412/D-638; tear strength, ASTM D-264; and Shore Hardness (A and D), ASTM D-2240. JEFFAMINE™ D-2000 is a 2000 molecular weight polyoxypropylene diamine available from Huntsman Petrochemical Corporation. JEFFAMINE™ T-5000 is a 5000 molecular weight polyoxypropylene triamine available from Huntsman Petrochemical Corporation. JEFFAMINE™ D-230 is a 230 molecular weight polyoxypropylene diamine available from Huntsman Petrochemical Corporation. JEFFAMINE™ T-403 is a 400 molecular weight polyoxypropylene triamine available from Huntsman Corporation. JEFFSOL™ PC is a propylene carbonate available from Huntsman Petrochemical Corporation. LUXATE™ ITM 800 is a cycloaliphatic isocyanate based on isophorone diisocyanate and a trimer of IPDI. LUXATE™ IU-500 is a cycloaliphatic isocyanate based on isophorone diisocyanate and IPDI urea. STAFLEX™ DEM is diethyl maleate available from C.P. Hall Company. STAFLEX™ DBM is dibutyl maleate available from C.P. Hall Company. Dioctyl maleate was obtained from Aristech Chemical Company. M-TMXDI™ is m-tetramethylxylenediisocyanate available from Cytec Industries. VESTANAT™ IPDI is isophorone diisocyanate available from Huls America. VESTAMIN™ IPD is isophorone diamine available from Huls America. MXDA is m-xylene diamine available from Mitsubishi. Diethyl maleate was obtained from Aldrich Chemical. JEFFCAT™ DMDEE, 2,2'-dimorpholinodiethylether, is a moisture cure catalyst to aid in excess isocyanate curing. The titanium dioxide employed was a rutile form available from E.I. DuPont de Nemours Company as Ti-Pure™ R-900.

Preparation of Derivative A: A Polyaspartic Ester from IPD and Diethyl Maleate

Following the procedure described in U.S. Pat. No. 5,243,012, a polyaspartic ester was prepared from isophorone diamine and diethyl maleate at a 1:2 mole ratio. To a 3 liter, 3 neck flask, 1305.4 g of diethyl maleate was charged under a nitrogen blanket. Under agitation, 660 g of isophorone diamine was added dropwise such that the exotherm was maintained at less than 50 C. Once the addition was complete, the product was digested at 50 C. for one hour. The product, which had an equivalent weight of 257 and a specific gravity of 1.1, was then used as the chain extender in the following examples and is denoted as "Derivative A".

Control Experiment 1

A control system was prepared using an isocyanate component which was a quasi-prepolymer of m-TMXDI, 50 pbw; and JEFFAMINE™ D-2000, 50 pbw. The isocyanate component was reacted with a resin blend component of JEFFAMINE™ D-2000, 45.3 pbw; JEFFAMINE™ T-5000, 30.2 pbw; and VESTAMIN™ IPD (isophorone diamine), 24.5 pbw. These components were mixed at a volume ratio of 1.00 (1.05 weight ratio) using the spray equipment described above. The system was applied to a silicone mold and the resulting aliphatic polyurea elastomer had a gel time of 1 second with a tack free time of less than 5 seconds. Formulation and elastomer physical property information is in Table 1.

Control Experiment 2

Using the same isocyanate component system as in Control Experiment 1, the isocyanate component was reacted with a resin blend component of JEFFAMINE™ D-2000, 40.8 pbw; JEFFAMINE™ T-5000, 27.2 pbw; and VESTAMIN™ IPD, 21.8 pbw; and Derivative A, 10.2 pbw. These components were mixed at a volume ratio of 1.00 (1.05 weight ratio) using the spray equipment described above. The system was applied to a silicone mold and the resulting aliphatic polyurea elastomer had a gel time of 1 second with a tack free time of less than 5 seconds. Formulation and elastomer physical property information is in Table 1.

Control Experiment 3

Using the same isocyanate component as in Control Experiment 1, the isocyanate component was reacted with a blend of JEFFAMINE™ D-2000, 36.9 pbw; JEFFAMINE™ T-5000, 24.6 pbw; VESTAMIN™ IPD, 19.2 pbw; and Derivative A, 19.2 pbw. These components were mixed at a volume ratio of 1.00 (1.05 weight ratio) using the spray equipment described above. The system was applied to a silicone mold and the resulting aliphatic polyurea elastomer had a gel time of 1 second with a tack free time of less than 5 seconds. Formulation and elastomer physical property information is in Table 1.

Discussion of Control Experiments 1–3

In aromatic and aliphatic polyurea spray elastomer systems, incorporation of a secondary amine chain extender will usually give some reduction in system reactivity. Often, by varying the content of such secondary amines, varying system reactivities are achieved. However, no reduction in reactivity was observed in Control Experiments 1–3 despite the incorporation of a previously formed polyaspartic ester, referred to as Derivative A.

TABLE 1

| Control Experiment | 1 | 2 | 3 |
|---|---|---|---|
| Isocyanate component | | | |
| m-TMDXI | 50 | 50 | 50 |
| JEFFAMINE ™ D-2000 | 50 | 50 | 50 |
| NCO, % | 14.7 | 14.7 | 14.7 |
| Resin Blends | | | |
| JEFFAMINE ™ D-2000 | 45.3 | 40.8 | 36.9 |
| JEFFAMINE ™ T-5000 | 30.2 | 27.2 | 24.6 |
| VESTAMIN ™ IPD | 24.5 | 21.8 | 19.2 |
| Derivative A (Polyaspartic ester) | 0 | 10.2 | 18.2 |
| Physical Properties | | | |
| Gel time, sec. | 1 | 1 | 1 |
| Tack free, sec. | <5 | <5 | <5 |
| Film thickness, mils | 25 | 25 | 25 |
| Tensile strength, pi | 1535 | 1235 | 1100 |
| Elongation, % | 535 | 570 | 490 |
| Tear Strength, pli | 380 | 315 | 305 |
| Shore D Hardness | 38 | 39 | 39 |
| Shore A Hardness | 81 | 81 | 83 |
| 100% Modulus, pi | 735 | 695 | 675 |
| 300% Modulus, pi | 1035 | 920 | 935 |

In situ Preparation of Polyaspartic Ester and Application

It is known that polyaspartic esters react slowly with aliphatic isocyanates, which previously necessitated the need to employ a metallo organic catalyst in systems employing such polyaspartic esters. See U.S. Pat. No. 5,243,012 in this regard. Yet in Control Experiments 1–3 above, a slowing of reactivity was not observed despite use of Derivative A. The inventors herein hypothesized that a higher level of polyaspartic ester may possibly be required in the system to affect overall reactivity. Control Experiments 4 and 5 were thus performed in which the polyaspartic ester was formed in situ as the resin blend was being prepared. This was accomplished by variable addition of the diethyl maleate to excess amine chain extender.

Control Experiment 4

The isocyanate component of Control Experiment 1 was reacted with a resin blend of JEFFAMINE™ D-2000, 59.2 pbw; JEFFAMINE™ T-5000, 10.4 pbw; VESTAMIN™ IPD, 20.5 pbw; and titanium dioxide, 9.8 pbw. These components were mixed at a volume ratio of 1.00 (0.97 weight ratio) using the spray equipment described above. The system was applied to a mold release coated steel mold and the resulting aliphatic polyurea elastomer had a gel time of 1 second with a tack free time of less than 5 seconds. The aliphatic polyurea elastomer was unacceptable since it was cheesy and easily broke apart. Formulation and elastomer physical properties are shown in Table 2.

Control Experiment 5

A control system was prepared using the same isocyanate quasi-prepolymer as in Control Experiment 4. The quasi-prepolymer was reacted with a resin blend of JEFFAMINE™ D-2000, 64.1 pbw; JEFFAMINE™ T-5000, 10.4 pbw; MXDA, 15.8 pbw; and titanium dioxide, 9.8 pbw. The components were mixed at a volume ratio of 1.00 (0.95 weight ratio) using the spray equipment described above. The system was applied to a mold release coated steel mold and the resulting aliphatic polyurea elastomer had a gel time of 1 second with a tack free time of less than 5 seconds. The aliphatic polyurea elastomer was of unacceptable quality, since it was cheesy and easily broke apart. Formulation and elastomer physical property information is shown in Table 2.

EXAMPLE 1

A resin blend was prepared by slow addition of diethyl maleate, 22.7 pbw, to VESTAMIN™ IPD, 22.0 pbw, under agitation. A slight exotherm was observed. The remainder the blend was prepared by addition of JEFFAMINE™ D-2000, 45.3 pbw; and titanium dioxide, 10.0 pbw. The resulting blend was reacted with the isocyanate quasi-prepolymer of Control Experiment 4. The components were mixed at a volume ratio of 1.00 (0.97 weight ratio) using the spraying equipment described above. The system was applied to a mold release coated steel mold and the resulting aliphatic polyurea elastomer had a gel time of greater than 1 minute and remained tacky after 24 hours. The system also underwent bubbling. Formulation and elastomer physical property information is found in Table 2.

EXAMPLE 2

A resin blend was prepared by slow addition of diethyl maleate, 21.3 pbw to VESTAMIN™ IPD, 15.3 pbw. Under agitation. A slight exotherm was observed. The remainder the blend was prepared by addition of JEFFAMINE™ D-2000, 48.7 pbw; JEFFAMINE™ T-5000, 4.7 pbw; and titanium dioxide, 10.0 pbw. The resulting blend was reacted with the isocyanate quasi-prepolymer of Control Experiment 4. The components were mixed at a volume ratio of 1.00 (0.96 weight ratio) using the spraying equipment described above. The system was applied to a mold release coated steel mold and the resulting aliphatic polyurea elastomer had a gel time of greater than 1 minute and remained tacky after 24 hours. The system also underwent bubbling. Formulation and elastomer physical property information is found in Table 2.

EXAMPLE 3

A resin blend was prepared by slow addition of diethyl maleate, 18.7 pbw to VESTAMIN™ IPD, 19.3 pbw. under agitation. A slight exotherm was observed. The remainder the blend was prepared by addition of JEFFAMINE™ D-2000, 46.7 pbw; JEFFAMINE™ T-5000, 5.3 pbw; and titanium dioxide, 10.0 pbw. The resulting blend was reacted with the isocyanate quasi-prepolymer of Control Experiment 4. The components were mixed at a volume ratio of 1.00 (0.96 weight ratio) using the spraying equipment described above. The system was applied to a mold release coated steel mold and the resulting aliphatic polyurea elastomer had a gel time of greater than 1 minute and remained tacky after 24 hours. The system also underwent bubbling. Formulation and elastomer physical property information is found in Table 2.

TABLE 2

|  | Control Expt. 4 | Control Expt. 5 | Ex. 1 | Ex. 2 | Ex. 3 |
| --- | --- | --- | --- | --- | --- |
| Isocyanate quasi-prepolymer |  |  |  |  |  |
| m-TMDXI | 50 | 50 | 50 | 50 | 50 |
| JEFFAMINE ™ D-2000 | 50 | 50 | 50 | 50 | 50 |
| NCO, % | 15.2 | 15.2 | 15.2 | 15.2 | 15.2 |
| Resin Blends |  |  |  |  |  |
| Pre-blend: |  |  |  |  |  |
| VESTAMIN ™ IPD | 0 | 0 | 22.0 | 15.3 | 19.3 |
| Diethyl Maleate | 0 | 0 | 22.7 | 21.3 | 18.7 |
| Blended with: |  |  |  |  |  |
| JEFFAMINE ™ D-2000 | 59.2 | 64.1 | 45.3 | 48.7 | 46.7 |
| JEFFAMINE ™ T-5000 | 10.4 | 10.4 | 0 | 4.7 | 5.3 |
| VESTAMIN ™ IPD | 20.5 | 0 | 0 | 0 | 0 |
| MXDA | 0 | 15.8 | 0 | 0 | 0 |
| Titanium dioxide | 9.8 | 9.8 | 10 | 10 | 10 |
| Physical Properties |  |  |  |  |  |
| Gel time, sec. | 1 | 1 | >60 | >60 | >60 |
| Tack free time | <5 sec. | <5 sec. | >24 hrs | >24 hrs | >24 hrs |
| Tensile strength, psi | 760 | 930 | NT | NT | NT |
| Elongation, % | 355 | 465 | NT | NT | NT |
| Tear Strength, pli | 265 | 280 | NT | NT | NT |
| Shore D Hardness | 35 | 34 | NT | NT | NT |
| 100% Modulus, psi | 625 | 625 | NT | NT | NT |
| 300% Modulus, psi | 770 | 805 | NT | NT | NT |

"NT" means not tested.

Control Experiment 6

A control system was prepared using an isocyanate quasi-prepolymer of VESTANAT™ IPDI, 45 pbw; and JEFFAMINE™ D-2000, 55 pbw. The quasi-prepolymer was reacted with a resin blend component of JEFFAMINE™ D-2000, 50.6 pbw; JEFFAMINE™ T-5000, 16.9 pbw; VESTAMIN™ IPD, 22.6 pbw; and titanium dioxide, 9.8 pbw. These components were mixed at a volume ratio of 1.00 (0.97 weight ratio) using the spraying equipment described above. The system was applied to a mold release coated steel mold and the resulting aliphatic polyurea elastomer had a gel time of less than 1 second and a tack free time of less than 1 second. Formulation and elastomer physical property information is found in Table 3.

Control Experiment 7

A control system was prepared using an isocyanate quasi-prepolymer of VESTANAT™ IPDI, 45 pbw; and JEFFAMINE™ D-2000, 55 pbw. The quasi-prepolymer was reacted with a resin blend component of JEFFAMINE™ D-2000, 64.7 pbw; JEFFAMINE™ T-5000, 10.3 pbw; MXDA, 15.2 pbw; and titanium dioxide, 9.8 pbw. These components were mixed at a volume ratio of 1.00 (0.95 weight ratio) using the spraying equipment described above. The system was applied to a mold release coated steel mold and the resulting aliphatic polyurea elastomer had a gel time of 1 second and a tack free time of less than 5 second. Formulation and elastomer physical property information is found in Table 3.

EXAMPLE 4

A resin blend was prepared by slow addition of diethyl maleate, 19.3 pbw, to VESTAMIN™ IPD, 20.0 pbw, under agitation. A slight exotherm was observed. The remainder the blend was prepared by addition of JEFFAMINE™ D-2000, 46.7 pbw; JEFFAMINE™ D-230, 4 pbw; and titanium dioxide, 10.0 pbw. The resulting blend was reacted with the isocyanate quasi-prepolymer of Control Experiment 6, 95 pbw; and JEFFSOL™ PC, 5 pbw. The components were mixed at a volume ratio of 1.00 (0.98 weight ratio) using the spraying equipment described above. The system was applied to a mold release coated steel mold and the resulting aliphatic polyurea elastomer had a gel time of greater than 40 seconds and a tack free time of 1.5 hours. Formulation and elastomer physical property information is found in Table 3.

the resulting aliphatic polyurea elastomer had a gel time of 8 seconds and a tack free time of 1 hour. Formulation and elastomer physical property information is found in Table 3.

EXAMPLE 6

A resin blend was prepared by slow addition of diethyl maleate, 17.7 pbw, to VESTAMIN™ PD, 20.7 pbw, under agitation. A slight exotherm was observed. The remainder the blend was prepared by addition of JEFFAMINE™ D-2000, 42.8 pbw; JEFFAMINE™ T-5000, 5 pbw; JEFFAMINE™ D-230, 4 pbw; and titanium dioxide, 10.0 pbw. The resulting blend was reacted with the isocyanate quasi-prepolymer of Control Experiment 4. The components were mixed at a volume ratio of 1.00 (0.97 weight ratio) using the spraying equipment described above. The system was applied to a mold release coated steel mold and the resulting aliphatic polyurea elastomer had a gel time of 30 seconds and a tack free time of 1 hour. Formulation and elastomer physical property information is found in Table 3.

TABLE 3

|  | Control Expt. 4 | Control Expt. 5 | Ex. 4 | Ex. 5 | Ex. 6 |
|---|---|---|---|---|---|
| Isocyanate quasi-prepolymer | | | | | |
| VESTANAT ™ IPDI | 45 | 45 | 47.5 | 47.5 | 47.5 |
| JEFFAMINE ™ D-2000 | 55 | 55 | 47.5 | 47.5 | 47.5 |
| JEFFSOL ™ PC | 0 | 0 | 5 | 5 | 5 |
| NCO, % | 14.8 | 14.8 | 16.1 | 16.1 | 16.1 |
| Resin Blends | | | | | |
| Pre-blend: | | | | | |
| VESTAMIN ™ IPD | 0 | 0 | 20.0 | 20.0 | 20.7 |
| Diethyl Maleate | 0 | 0 | 19.3 | 12.7 | 17.7 |
| Blended with: | | | | | |
| JEFFAMINE ™ D-2000 | 50.6 | 64.7 | 46.7 | 53.3 | 42.8 |
| JEFFAMINE ™ T-5000 | 16.9 | 10.3 | 0 | 0 | 5.0 |
| VESTAMIN ™ IPD | 22.6 | 0 | 0 | 0 | 0 |
| MXDA | 0 | 15.2 | 0 | 0 | 0 |
| Titanium dioxide | 9.8 | 9.8 | 10 | 10 | 10 |
| Physical Properties | | | | | |
| Gel time, sec. | <1 | 1 | 40 | 8 | 30 |
| Tack free time | <1 sec. | <5 sec. | 1.5 hrs | <1 hr | 1 hr |
| Tensile strength, psi | NT | NT | 1375 | 1915 | 850 |
| Elongation, % | NT | NT | 532 | 475 | 385 |
| Tear Strength, pli | NT | NT | 325 | 385 | 280 |
| Shore D Hardness | NT | NT | 43 | 48 | 46 |
| 100% Modulus, psi | NT | NT | 850 | 1075 | 675 |
| 300% Modulus, psi | NT | NT | 1045 | 1470 | 805 |

"NT" means not tested.

EXAMPLE 5

A resin blend was prepared by slow addition of diethyl maleate, 12.7 pbw, to VESTAMIN™ IPD, 20.0 pbw, under agitation. A slight exotherm was observed. The remainder the blend was prepared by addition of JEFFAMINE™ D-2000, 53.3 pbw; JEFFAMINE™ D-230, 4 pbw; and titanium dioxide, 10.0 pbw. The resulting blend was reacted with the isocyanate quasi-prepolymer of Control Experiment 6, 95 pbw; and JEFFSOL™ PC, 5 pbw. The components were mixed at a volume ratio of 1.00 (0.98 weight ratio) using the spraying equipment described above. The system was applied to a mold release coated steel mold and

EXAMPLE 7

A resin blend was prepared by slow addition of diethyl maleate, 17.2 pbw, to MXDA, 18.5 pbw, under agitation. A slight exotherm was observed. The remainder of the blend was prepared by addition of JEFFAMINE™ D-2000, 48.9 pbw; JEFFAMINE™ T-5000, 5.3 pbw; JEFFCAT™ DMDEE, 0.2 pbw; and titanium dioxide, 10.0 pbw. The resulting blend was reacted with the isocyanate quasi-prepolymer of Control Experiment 6, 95 pbw; and JEFFSOL™ PC, 5 pbw. The components were mixed at a volume ratio of 1.00 (0.98 weight ratio) using the spraying equipment described above. The system was applied to a mold release coated steel mold and the resulting aliphatic polyurea elastomer had a gel time of 25 seconds and a tack free time of 45 minutes. Formulation and elastomer physical property information is found in Table 4.

EXAMPLE 8

A resin blend was prepared by first mixing JEFFAMINE™ D-2000, 48.9 pbw; JEFFAMINE™ T-5000, 5.3 pbw; MXDA, 18.5 pbw; JEFFCAT™ DMDEE, 0.2 pbw; and titanium dioxide, 10.0 pbw. Under agitation, diethyl maleate, 17.2 pbw is slowly added. To this blend, titanium dioxide, 9.9 pbw is then added. The resulting blend was reacted with the isocyanate quasi-prepolymer of Control Experiment 6, 95 pbw; and JEFFSOL™ PC, 5 pbw. The components were mixed at a volume ratio of 1.00 (0.97 weight ratio) using the spraying equipment described above. The system was applied to a mold release coated steel mold and the resulting aliphatic polyurea elastomer had a gel time of 72 seconds and a tack free time of 1 hour. Formulation and elastomer physical property information is found in Table 4.

TABLE 4

|  | Control Expt. 5 | Ex. 7 | Ex. 8 |
|---|---|---|---|
| Isocyanate quasi-prepolymer |  |  |  |
| VESTANAT ™ IPDI | 45 | 47.5 | 47.5 |
| JEFFAMINE ™ D-2000 | 55 | 47.5 | 47.5 |
| JEFFSOL ™ PC | 0 | 5 | 5 |
| NCO, % | 14.8 | 16.1 | 16.1 |
| Resin Blends |  |  |  |
| Pre-blend: |  |  |  |
| MXDA | 0 | 18.5 | 0 |
| Diethyl Maleate | 0 | 17.2 | 0 |
| Blended with: |  |  |  |
| JEFFAMINE ™ D-2000 | 64.7 | 48.9 | 48.9 |
| JEFFAMINE ™ T-5000 | 10.3 | 5.3 | 5.3 |
| MXDA | 15.2 | 0 | 18.5 |
| JEFFCAT ™ DMDEE | 0 | 0.2 | 0.2 |
| Titanium dioxide | 9.8 | 9.9 | 0 |
| Blend in: |  |  |  |
| Diethyl Maleate | 0 | 0 | 17.2 |
| Blend in: |  |  |  |
| Titanium Dioxide | 0 | 0 | 9.9 |
| Physical Properties |  |  |  |
| Gel time, sec. | <1 | 25 | 72 |
| Tack free time | <5 sec. | 45 sec. | 1 hr |
| Tensile strength, psi | NT | 1105 | 1115 |
| Elongation, % | NT | 655 | 665 |
| Tear Strength, pli | NT | 270 | 205 |
| Shore D Hardness | NT | 37 | — |
| 100% Modulus, psi | NT | 495 | 430 |
| 300% Modulus, psi | NT | 700 | 635 |

"NT" means not tested.

In the following tables, additional examples are set forth. In these additional examples, the polyurea elastomers were prepared and processed as described in the procedures for examples 1–8. In these additional examples, the polyurea elastomers produced a very clear elastomeric film when applied to a substrate at a film thickness of less than 10 mils (0.010 inches). These systems were also applied to a variety of surfaces, including wood, paper picture, samples of aromatic polyurea spray, expanded polystyrene, aluminum, concrete and steel. Excellent elastomer adhesion was noted to all of these substrates.

TABLE 5

|  | Ex. 9 | Ex. 10 | Ex. 11 | Ex. 12 |
|---|---|---|---|---|
| Isocyanate quasi-prepolymer |  |  |  |  |
| LUXATE ™ ITM 800 | 57 | 57 | 57 | 0 |
| LUXATE ™ IU-500 | 0 | 0 | 0 | 57 |
| JEFFAMINE ™ D-2000 | 38 | 38 | 38 | 38 |
| JEFFSOL ™ PC | 0 | 0 | 0 | 5 |
| NCO, % | 15.5 | 15.5 | 15.5 | 15.8 |
| Resin Blends |  |  |  |  |
| Pre-blend: |  |  |  |  |
| VESTAMIN ™ IPD | 24.2 | 25 | 25.6 | 24.2 |
| STAFLEX ™ DEM | 18.8 | 0 | 0 | 18.8 |
| STAFLEX ™ DBM | 0 | 23.6 | 0 | 0 |
| Dioctyl Maleate | 0 | 0 | 35.5 | 0 |
| Blended with: |  |  |  |  |
| JEFFAMINE ™ D-2000 | 42.2 | 36.4 | 22.8 | 42.2 |
| JEFFAMINE ™ T-5000 | 5.0 | 5.1 | 5.1 | 5.0 |
| Titanium dioxide | 9.9 | 10.0 | 10.1 | 9.9 |
| Physical Properties |  |  |  |  |
| Index | 1.1 | 1.1 | 1.1 | 1.12 |
| Gel time, sec. | 20 | 20 | 25 | 20 |
| Tensile strength, psi | 1355 | 1275 | NT | NT |
| Elongation, % | 255 | 25 | NT | NT |
| Tear Strength, pli | 340 | 315 | NT | NT |
| Shore D Hardness | 46 | 45 | NT | NT |
| 100% Modulus, psi | 1050 | — | NT | NT |
| 300% Modulus, psi | — | — | NT | NT |

TABLE 6

|  | Ex. 13 | Ex. 14 | Ex. 15 |
|---|---|---|---|
| Isocyanate quasi-prepolymer |  |  |  |
| m-TMXDI ™ | 50 | 50 | 50 |
| JEFFAMINE ™ D-2000 | 50 | 50 | 50 |
| NCO, % | 15.2 | 15.2 | 15.2 |
| Resin Blends |  |  |  |
| Pre-blend: |  |  |  |
| VESTAMIN ™ IPD | 26.1 | 0 | 0 |
| JEFFAMINE ™ D-230 | 0 | 37.9 | 0 |
| JEFFAMINE ™ T-403 | 0 | 0 | 50.5 |
| STAFLEX ™ DEM | 21.8 | 15.9 | 17.9 |
| Blended with: |  |  |  |
| JEFFAMINE ™ D-2000 | 41.0 | 36.3 | 31.6 |
| JEFFAMINE ™ T-5000 | 10.1 | 10.0 | 0 |
| JEFFAMINE ™ D-230 | 1 | 0 | 0 |
| Physical Properties |  |  |  |
| Index | 1.05 | 1.05 | 1.05 |
| Gel time, sec. | NT | 45 | 26 |
| Tack free, min | NT | 5 | 5 |
| Tensile strength, psi | NT | NT | NT |
| Elongation, % | NT | NT | NT |
| Tear Strength, pli | NT | NT | NT |
| Shore D Hardness | NT | NT | NT |
| 100% Modulus, psi | NT | NT | NT |
| 300% Modulus, psi | NT | NT | NT |

TABLE 7

|  | Ex. 16 | Ex. 17 | Ex. 18 | Ex. 19 |
|---|---|---|---|---|
| Isocyanate quasi-prepolymer |  |  |  |  |
| VESTANAT ™ IPDI | 50 | 50 | 50 | 50 |
| JEFFAMINE ™ D-2000 | 50 | 50 | 50 | 50 |
| NCO, % | 16.9 | 16.9 | 16.9 | 16.9 |
| Resin Blends |  |  |  |  |
| Pre-blend: |  |  |  |  |
| VESTAMIN ™ IPD | 28.7 | 0 | 0 | 0 |
| JEFFAMINE ™ D-230 | 0 | 42.9 | 0 | 20.1 |
| JEFFAMINE ™ T-403 | 0 | 0 | 30.2 | 21.7 |
| STAFLEX ™ DEM | 23.3 | 18.1 | 17.7 | 27.3 |
| Blended with: |  |  |  |  |
| JEFFAMINE ™ D-2000 | 36.0 | 29.0 | 37.9 | 25.9 |
| JEFFAMINE ™ T-5000 | 10.0 | 10.1 | 0 | 0 |
| VESTAMIN ™ IPD | 0 | 0 | 14.2 | 5.0 |
| Physical Properties |  |  |  |  |
| Index | 1.06 | 1.06 | 1.06 | 1.06 |
| Gel time, sec. | 35 | 35 | 35 | 60 |
| Tack free, min | 3 | >5 | 4 | 4 |
| Tensile strength, psi | 1580 | 1550 | 1520 | 1600 |
| Elongation, % | 520 | 700 | 280 | 380 |
| Tear Strength, pli | 375 | 315 | 365 | 325 |
| Shore D Hardness | 46 | 43 | 46 | 49 |
| 100% Modulus, psi | 965 | 610 | 1090 | 890 |
| 300% Modulus, psi | 1140 | 800 | 1775 | 1300 |

TABLE 8

|  | Ex. 20 | Ex. 21 | Ex. 22 | Ex. 23 |
|---|---|---|---|---|
| Isocyanate quasi-prepolymer |  |  |  |  |
| VESTANAT ™ IPDI | 47.5 | 47.5 | 47.5 | 47.5 |
| JEFFAMINE ™ D-2000 | 47.5 | 47.5 | 47.5 | 47.5 |
| JEFFSOL ™ PC | 5 | 5 | 5 | 5 |
| NCO, % | 16.1 | 16.1 | 16.1 | 16.1 |
| Resin Blends |  |  |  |  |
| Pre-blend: |  |  |  |  |
| VESTAMIN ™ IPD | 28.4 | 28.4 | 28.4 | 28.4 |
| STAFLEX ™ DEM | 20.5 | 17.3 | 14.3 | 63.3 |
| Blended with: |  |  |  |  |
| JEFFAMINE ™ D-2000 | 40.1 | 44.0 | 47.1 | 4.0 |
| JEFFAMINE ™ T-5000 | 10.0 | 10.1 | 10.0 | 1.0 |
| JEFFAMINE ™ D-230 | 1 | 0 | 0 | 0 |
| Physical Properties |  |  |  |  |
| Index | 1.05 | 1.05 | 1.05 | 1.05 |
| Gel time, sec. | 45 | <1 | <1 | NT |
| Tack free, sec | 140 | 50 | 30 | NT |
| Tensile strength, psi | 1355 | 1275 | NT | NT |
| Elongation, % | 285 | 210 | NT | NT |
| Tear Strength, pli | 355 | 375 | NT | NT |
| Shore D Hardness | 51 | 44 | NT | NT |
| 100% Modulus, psi | 1075 | 1040 | NT | NT |

TABLE 9

|  | Ex. 24 | Ex. 25 | Ex. 26 | Ex. 27 |
|---|---|---|---|---|
| Isocyanate quasi-prepolymer |  |  |  |  |
| VESTANAT ™ IPDI | 47.5 | 47.5 | 47.5 | 47.5 |
| JEFFAMINE ™ D-2000 | 47.5 | 47.5 | 47.5 | 47.5 |
| JEFFSOL ™ PC | 5 | 5 | 5 | 5 |
| NCO, % | 16.1 | 16.1 | 16.1 | 16.1 |
| Resin Blends |  |  |  |  |
| Pre-blend: |  |  |  |  |
| VESTAMIN ™ IPD | 23.75 | 22.1 | 21.3 | 0 |
| JEFFAMINE ™ D-230 | 0 | 0 | 0 | 33.8 |
| STAFLEX ™ DEM | 22.5 | 21.9 | 18.7 | 14.2 |
| Blended with: |  |  |  |  |
| JEFFAMINE ™ D-2000 | 33.75 | 35.9 | 38.5 | 36.9 |
| JEFFAMINE ™ T-5000 | 10.0 | 10.0 | 10.75 | 10.0 |
| JEFFAMINE ™ T-403 | 10.0 | 0 | 0 | 0 |
| Physical Properties |  |  |  |  |
| Index | 1.05 | 1.05 | 1.05 | 1.05 |
| Gel time, sec. | <1 | <1 | 15 | 8 |
| Tack free, sec | 50 | 55 | 90 | 90 |
| Tensile strength, psi | 580 | 1120 | 1005 | 880 |
| Elongation, % | 180 | 415 | 170 | 485 |
| Tear Strength, pli | 205 | 320 | 315 | 245 |
| Shore D Hardness | 36 | 44 | 46 | 40 |
| 100% Modulus, psi | 500 | 825 | 840 | 540 |
| 300% Modulus, psi | — | 965 | — | 695 |

What is claimed is:

1. A method for the preparation of polyurea elastomers, comprising:
   (a) reacting an amine chain extender with dialkyl maleate or fumarate to form aspartic ester, wherein the mole ratio of amine functionality in the amine chain extender to dialkyl maleate or fumarate is greater than 1:1, wherein the amine chain extender is a polyamine;
   (b) blending the product of step (a) with one or more polyoxyalkyleneamines to prepare a resin blend;
   (c) reacting the resin blend with an isocyanate to form polyurea elastomer.

2. The process of claim 1, wherein the dialkyl maleate or fumarate is a dialkyl maleate, and wherein the dialkyl maleate is dimethyl maleate, diethyl maleate, dibutyl maleate or dioctyl maleate.

3. The process of claim 1, wherein the amine chain extender is a polyoxyalkylene polyamine.

4. The process of claim 1, wherein the amine chain extender is isophorone diamine.

5. The process of claim 1, wherein the amine chain extender is a xylene diamine.

6. The process of claim 1, wherein the isocyanate is a quasi-polymer formed from a polyoxyalkyleneamine and a diisocyanate.

7. The process of claim 1, wherein the mole ratio of amine functionality in the amine chain extender to dialkyl maleate or fumarate is about 2:1.

8. The process of claim 1, wherein reacting step (c) occurs by mixing the resin blend and isocyanate in an impingement mixer and by spraying a resulting mixture onto a surface.

9. The process of claim 1 which is conducted in the absence of metallo organic catalyst.

10. The process of claim 1, wherein the polyurea elastomer has a gel time of at least about 8 seconds and a tack free time of less than about 2 hours.

11. A polyurea elastomer, comprising the reaction product of (a) resin blend containing one or more polyoxyalkylenamine and an aspartic ester and (b) an isocyante, wherein the aspartic ester in the resin blend comprises a reaction product of an amine chain extender and a dialkyl maleate or fumarate, wherein the mole ratio of amine functionality in the chain extender to the dialkyl maleate or fumarate is greater than 1:1, and wherein the chain extender is a polyamine.

12. The polyurea elastomer of claim 11, wherein the elastomer has a gel time of at least about 8 seconds and a tack free time of less than about 2 hours.

13. The polyurea elastomer of claim 11 which is free of a metallo organic catalyst.

14. The polyurea elastomer of claim 11 further comprising a pigment.

15. The polyurea elastomer of claim 11, wherein the dialkyl maleate or fumarate is a dialkyl maleate, and wherein the dialkyl maleate is dimethyl maleate, diethyl maleate, dibutyl maleate or dioctyl maleate.

16. The polyurea elastomer of claim 11, wherein the amine chain extender is a polyoxyalkylene polyamine.

17. The polyurea elastomer of claim 11, wherein the amine chain extender is isophorone diamine.

18. The polyurea elastomer of claim 11, wherein the amine chain extender is a xylene diamine.

19. The polyurea elastomer of claim 11, wherein the isocyanate is a quasi-polymer formed from a polyoxyalkyleneamine and a diisocyanate.

20. The process of claim 11, wherein the mole ratio of amine functionality in the amine chain extender to dialkyl maleate or fumarate is about 2:1.

* * * * *